(12) United States Patent
Abraham

(10) Patent No.: US 12,062,117 B2
(45) Date of Patent: Aug. 13, 2024

(54) METHOD FOR CREATING A WORK OF GRAPHIC ART

(71) Applicant: Albert Abraham, Wichita, KS (US)

(72) Inventor: Albert Abraham, Wichita, KS (US)

( * ) Notice: Subject to any disclaimer, the term of this patent is extended or adjusted under 35 U.S.C. 154(b) by 84 days.

(21) Appl. No.: 17/941,189

(22) Filed: Sep. 9, 2022

(65) Prior Publication Data

US 2023/0073203 A1    Mar. 9, 2023

(51) Int. Cl.
*G06T 11/00* (2006.01)
*G06T 11/60* (2006.01)

(52) U.S. Cl.
CPC ............ *G06T 11/001* (2013.01); *G06T 11/60* (2013.01)

(58) Field of Classification Search
CPC ................................ G06T 11/001; G06T 11/60
See application file for complete search history.

(56) References Cited

U.S. PATENT DOCUMENTS

| | | | |
|---|---|---|---|
| 5,568,391 A | 10/1996 | Mckee | |
| 6,829,063 B1 * | 12/2004 | Allebach | H04N 1/4051 358/534 |
| 8,367,185 B1 * | 2/2013 | Kay | A63F 9/06 428/138 |
| 2004/0221530 A1 | 11/2004 | Winberry | |
| 2005/0047651 A1 | 3/2005 | Zheng | |
| 2005/0147322 A1 | 7/2005 | Saed | |
| 2021/0149496 A1 * | 5/2021 | Sen | G06T 7/20 |

FOREIGN PATENT DOCUMENTS

MX    2017008886    8/2019

* cited by examiner

*Primary Examiner* — Phi Hoang
(74) *Attorney, Agent, or Firm* — Kenneth H. Jack; Davis & Jack L.L.C.

(57) ABSTRACT

A method for creating a work of graphic art including steps of providing six tiles displaying a four signifying color; providing four tiles displaying a three signifying color; providing four tiles displaying a five signifying color; providing three tiles displaying a two signifying color; providing three tiles displaying a six signifying color; providing a tile displaying a one signifying color; providing a tile displaying a seven signifying color; providing a tile displaying a zero signifying color; providing a tile displaying a nine signifying color; providing a flat surface and successively placing the tiles upon the surface so that the tiles form a matrix of six submatrixes, wherein each submatrix has four of the tiles, and wherein the sum of numbers signified by each submatrix's colors equals 16.

11 Claims, 6 Drawing Sheets
(6 of 6 Drawing Sheet(s) Filed in Color)

METHOD FOR CREATING A WORK OF GRAPHIC ART

FIELD OF THE INVENTION

This invention relates to two or three dimensional graphic art. More particularly, this invention relates to methods and processes for creating works of two dimensional or three dimensional graphic art of the cubism genre.

BACKGROUND OF THE INVENTION

Works of two dimensional or three dimensional graphic art of the cubism genre are commonly known to incorporate or comprise multiplicities of multi-colored quadrilateral, square, or rectangular elements which are arranged by the artist upon a two dimensional surface or canvas. Such works are commonly created as a mode of the artist's expression of an artistic impulse, inspiration, or motivation, such being commonly described as an artist's "muse". Such cubism genre artistic works are also often intended by the artist to perform functions of conveying to an observer an intended message or meaning related to a subject or concept chosen by the artist.

Works of cubism genre graphic art which are created in accordance with the instant inventive method are recognized as similarly emanating from artistic impulses, inspirations, and motivations, and are similarly recognized as performing functions of conveying a message or meaning relating to a subject or concept. In the instant invention, the numeral 3, or alternatively 4, is recognized as being central to the artist's artistic impulse, inspiration, and motivation. Also in the instant invention, such numeral is recognized as constituting central aspects of the meaning or message to be conveyed by the completed work of art. Under the workings of the instant invention, such numeral 3 (or alternatively 4) significantly controls and contributes to the creation of the art work, and determines the nature and appearance of the completed work.

BRIEF SUMMARY OF THE INVENTION

The instant invention constitutes a method for creation of a work of cubism genre art where such work compromises a matrix of four sided or four ended submatrixes. The four sides or ends of each of such submatrixes are recognized as conforming with the work's intended cubism genre which commonly incorporates multiplicities of four sided or four ended elements.

The basic elements of the artistic work, the creation of which constitute the object of the instant inventive method, preferably comprise tiles. In a suitable mode of performance of the method, the tile elements are four sided, each being at least rectangular, and preferably square. It is preferable that each tile have an easily recognizable thickness when placed upon a flat surface, the observable thicknesses of the tile elements being consonant with and in promotion of the work's cubism genre. The tiles which are provided in accordance with the invention's method steps may be composed of any rigid or semi-rigid material such as wood, plastic, ceramic, or metal.

In the inventive method, a variable T which is set at 4 (T=4) for purposes of consistency with the work's intended cubism genre. Such variable T is equal to the preferred number of sides of the tile elements, and is also equal to the number of sides or ends of the art work's sub-matrixes. Accordingly, such variable T provides and controls method steps described below.

The variable T thereby conforms with and promotes the cubism genre of works of art which are created via performance of the method.

The method has two variations, $V_3$ and $V_4$. Several of the characteristics and steps of the $V_3$ variation are determined by a control number $C_3$ which equals 3. In the $V_4$ method variant, a control number $C_4$ which equals 4 similarly determines that method's steps.

For each of the $V_3$ and $V_4$ method variations, an exact number of tiles (i.e., M tiles) is provided, where:

$$M = \frac{C^4 + C^2 + 2C}{T}$$

In the $V_3$ method variant, $C=C_3=3$ and, as indicated above, $T=4$. Accordingly, the number of tiles, $M_3$, provided in the $V_3$ $$\text{method variant} = \frac{(C_3^4 + C_3^2 + 2C_3)}{T} = \frac{(3^4 + 3^2 + 6)}{4} = 24$$

By substituting $C_4=4$ for $C_3=3$, the number of tiles, $M_4$, provided in the $V_4$ method variant=70. In $V_3$, $M_3$ tiles or 24 tiles are provided. In the alternative $V_4$ method, $M_4$ or 70 tiles are provided.

The object of each of the method variants $V_3$ and $V_4$ is the creation of a cubist genre work of multi-colored graphic art. Accordingly, coloration is preferably provided upon a surface of each of the provided tiles. The steps of provision of colors upon the tiles perform multiple functions including facilitating the creation of the colorful work of cubism genre art, and service as number 3 based (or alternatively number 4 based) number value indicia. In the instant invention, the number 3 (or alternatively 4) controls the repetition of colors upon the provided tiles and controls placements of the tiles within the four sided or four ended submatrix elements of the completed work of art.

In order to allow the provided colors to perform such functions, the $V_3$ and $V_4$ method alternatives require that the colors provided upon the tiles be precisely correlated with number values which are mathematically derived from either the number 3 or the number 4.

The "3" or "4" based number values of the $V_3$ and $V_4$ method variants are signified by colors which are displayed upon the tiles, such number values being selected from the series of integers $S=\{0,1,2,3,4, \ldots g\}$ where the greatest member g of the series is derived from a subset s which includes beginning members of such series S.

For each of the $V_3$ and $V_4$ method variants, the subset $s=\{0,1, \ldots, (C-1)\}$. Accordingly, in the $V_3$ method variant, the subset $s_3=\{0,1, \ldots, (C_3-1)\}=\{0,1, \ldots, (3-1)\}$. Accordingly, for $V_3$, $s_3=$the first three members of S, or the set $\{0,1,2\}$. Alternatively, for $V_4$, $s_4=$the first four members of S, or $\{0,1,2,3\}$.

In $V_3$ method variant, the number of unique T element or four element rotational series of numbers selected from $s_3=M_3=24$. Correspondingly for $V_4$, the number of unique T element rotational series of numbers selected from $s_4=M_4=70$.

The rotational series aspect of the instant invention utilizes a cycling sequence or a looping progression among a fixed set of discreet things or numbers. For example, a four element rotational series of things selected from a group of three distinct things (for example, the group of ♥, ●, and ▲) may be:

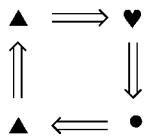

which may also be represented by a clockwise linear sequence such as ▲, ♥, ●, ▲ or a counter-clockwise linear sequence such as ●, ♥, ●, ●. Where three unique things are provided (i.e., $C_3=3$), the number of unique four element rotational series of those three things =

$$\frac{(C_3^4 + C_3^2 + 2C_3)}{T} = \frac{(3^4 + 3^2 + 2(3))}{4} = \frac{(81+9+6)}{4} = \frac{96}{4} = 24 = M_3,$$

as indicated above. Where, for example, the three unique things constitute the above referenced ●, ♥, and ● objects, a graphic portrayal of the 24 unique four element rotational series of those three things appears immediately below:

Adding one additional unique thing (such as a ■) to the above group of three unique things substitutes $C_4=4$ for $C_3=3$, resulting in 70, or $M_4$ unique rotational series.

Rather than utilizing unique objects such as ♥, ●, and ▲, the set of unique things utilized in the instant inventive method comprises the integer members of the s or $s_4$ subsets, as applicable, which are the number sets {0,1,2} and {0,1,2,3}. Instead of the 24 unique four element rotational series of graphic objects diagramed above, the 24 unique four element rotational series of things of the $V_3$ method variant are selected from the set s={0,1,2}. The exclusive list of $V_3$'s rotational series appears below:

0, 0, 0, 0
0, 0, 0, 1
0, 0, 0, 2
0, 0, 1, 1
0, 0, 1, 2
0, 0, 2, 1
0, 0, 2, 2
0, 1, 0, 1
0, 1, 0, 2
0, 1, 1, 1
0, 1, 1, 2
0, 1, 2, 1
0, 1, 2, 2
0, 2, 0, 2
0, 2, 1, 1
0, 2, 1, 2
0, 2, 2, 1
0, 2, 2, 2
1, 1, 1, 1
1, 1, 1, 2
1, 1, 2, 2
1, 2, 1, 2
1, 2, 2, 2
2, 2, 2, 2

According to the instant inventive $V_3$ method, the four members of each of the above 24 four element rotational series must be summed. The last rotational series {2,2,2,2} produces a highest sum, 2+2+2+2=8. Such highest sum, 8, is utilized as the greatest member $g_3$ of the set $S_3$. Accordingly for $V_3$, $S_3=\{0,1,2, \ldots g_3\}=\{0,1,2,3,4,5,6,7,8\}$. Correspondingly in $V_4$, the highest sum among $V_4$'s four element rotational series is the sum of the set {3,3,3,3}. Accordingly, for $V_4$, $S_4=\{0,1,2,3, \ldots g_4\}=\{0,1,2,3,4,5,6,7,8,9,10,11,12\}$.

Also according to the instant inventive method, each tile among $V_3$'s $M_3=24$ tiles displays a color which functions a number value indicia which represents one of the nine numbers selected from the $S_3$ set {0,1,2,3,4,5,6,7,8}. For the $V_4$ method variant, each of its $M_4=70$ tiles bears a color indicia representing one of the thirteen number values selected from the $S_4$ set {0,1,2,3,4,5, 6,7,8, 9,10,11,12}.

In the $V_3$ method variant, only one of the four element rotational series of integers selected from the $S_3$ series {0,1,2] has a sum of zero (i.e., the rotational series {0,0,0,0} whose sum equals zero). Similarly, only one of $V_3$'s rotational series sums to 1 (i.e., {0,1,0,0}), only 1 sums to 7 (i.e., {2,2,2,1}), and only 1 sums to 8 (i.e., {2,2,2,2}). Accordingly, among the $M_3$ or 24 tiles provided in the $V_3$ method only one tile has a color indicia signifying 0, and three other tiles among $V_3$'s $M_3$ or 24 tiles similarly display a unique color indicia which signifies 1, 7, or 8.

In a suitable mode of performance of the $V_3$ method, the single tiles, or those whose color signified number value is repeated only once within $M_3$, may display grayscale colors as their number value indicia. For example, white may signify 0, black may signify 8, light gray may signify 1, and dark gray may signify 7. One of each of such grayscale colors may be displayed upon a first four tiles among the $M_3=24$ tiles. Such grayscale color scheme may advantageously remind performers or operators of the method of the fact that the grayscale signified values are not repeated, while providing a value differentiating color upon each of the four tiles.

Each of the remaining 20 four element rotations of the members of the $s_3$ set of {0,1,2} has a sum which is repeated. Three of the $V_3$'s four element rotations have a sum of 2. Accordingly, each of three tiles among the $M_3=24$ tiles may display a consistent and unique 2 value signifying color. For example, red may signify 2, and three of the tiles may be colored red. Another three of $V_3$'s four element rotations have the sum of 6. Accordingly, each of another three tiles among the $M_3$=24 tiles may display another consistent and unique color signifying 6. For example, yellow may signify 6. Four of the $V_3$ rotations have a sum of 3. Accordingly, four of $V_3$'s tiles may display another consistent and unique 3 value signifying color, such as green. Another four of the $V_3$ rotations have a sum of 5. Accordingly, another four of the $M_4$ tiles may display another color which signifies 5. For example, brown may signify 5.

Upon providing white, black, light gray, dark gray, red, yellow, green, and brown number signifying colors upon eighteen of the $M_3$ tiles, as indicated above, the sole remaining unused number value from the $S_3$ set $\{0,1,2,3,4,5,6,7,8\}$ is such set's middle value 4. The remaining six of $V_3$'s four element rotations have a sum of 4. Accordingly, a final unique number value indicating color may be repeated upon the remaining six tiles among the $M_3$=24 tiles. For example, the six remaining tiles may be colored blue, each blue coloration signifying 4.

A graph of the above exemplary assignments of color based number value indicia to $V_3$'s set of $M_3$ or 24 tiles appears in Drawing FIG. 6. As can be seen in the FIG. 6 drawing, the renditions or repetitions of $V_3$'s color indicated number values from 0-8 approximates a bell curve which is shown in a dashed line.

A similar bell curve graph may be created representing similar assignments of color based number value indicia to $V_4$'s $M_4$=70 tiles, such graph showing repetitions of thirteen unique colors assigned to $M_4$'s 70 tiles, each unique color representing one of the number values of $S_4$=$\{0,1,2,3,4,5,6,7,8,9,10,11,12\}$ As shown above, the numbers 3 and 4 substantially control the performance of the $V_3$ and $V_4$ methods by specifying the number of tiles which are provided, and by specifying the colors which appear upon the tiles.

A further step performed in both the $V_3$ method and the $V_4$ method comprises a provision of a substantially flat surface upon which the tiles may be displayed. Suitably, the flat surface may comprise a table top or counter surface. Preferably, the flat surface comprises an artist's canvas, plate, or plaque. Suitably, the surface may comprise an upturned side or face of a semi-rigid sheet of cardboard of card stock.

In the $V_3$ method, and assuming that a cardboard surface has been provided, tiles selected from the $M_3$ set of 24 tiles are successively placed and displayed upon the surface. Such successive tile placements preferably produce a matrix of six square submatrixes, each submatrix comprising a grouping of four tiles. Each of such submatrix groups is preferably square. The $V_3$ method variant recognizes that the sum of all of the color indicated numbers displayed upon the $M_3$ or 24 tiles equals 96, and recognizes that such sum divided by the number of submatrixes (i.e., 96 divided by 6) equals 16.

The $V_3$ method also recognizes that, where tiles are placed within one of $V_3$'s submatrixes so that the sum of that submatrix's color indicated number values equals 16, the 20 remaining tiles among $M_3$ may be arranged to form five additional square submatrixes, each similarly having such 16 sum. Similarly, upon completion of two 16 value submatrixes, the remaining 16 tiles among the $M_3$ tiles may thereafter be placed upon the surface to complete four additional 16 value submatrixes. Finally, upon placements of 20 tiles among the 24 $M_3$ tiles upon the surface in a manner completing five 16 value submatrixes, the remaining four tiles necessarily have color indicated values totaling 16. Those last four tiles may be utilized to complete the work of art via completion of a final or sixth 16 value submatrix.

Where all of the tiles of the $M_3$ set of 24 tiles are placed upon the board surface to create a matrix of six submatrixes of four tiles, and where the total tile value of each submatrixes equals 16, the work of graphic art which is the subject or object of the inventive method is completed.

In attempting to perform the $V_3$ method, an artist may erroneously place a tile within one of the six square submatrixes under circumstances where it would thereafter be mathematically impossible to complete six 16 value submatrixes. For example and assuming assignments of number indicating colors to $V_3$'s 24 tiles as described above, one submatrix may include a black 8 value tile, and other submatrixes may include the white 0 value tile, and the light gray 1 value tile. If the artist were to place the single dark gray 7 value tile within the matrix containing the black 8 value tile, it would thereafter be mathematically impossible to complete a matrix of six 16 value submatrixes. Upon such placement of the dark gray tile, the sum of that submatrix's gray and black tiles would be 15, and two of the remaining unfilled quadrants of the submatrix would necessarily receive tiles having a cumulative value greater than 1. Following the placement of the dark gray 7 value tile, that submatrix could only be completed by subsequent placements of both the single 0 value white tile and the single light gray value 1 value tile within the submatrixes' two remaining quadrants. However in the above scenario, the light gray 1 value tile has been previously placed elsewhere in the matrix of tiles, and is unavailable.

Accordingly, in the above tile placement scenario, the placement of the dark gray 7 value tile into the submatrix next to the black 8 value tile would be deemed "illegal" and outside the method of the invention.

According to the instant inventive $V_3$ method, any tile placement which results in mathematical impossibility of completing the matrix of six submatrixes whose total tile values equal 16, constitutes an illegal placement falling outside the method.

In the $V_4$ variant of the method where $S_4$=$\{0,1,2,3,4,5,6,7,8,9,10,11,12\}$, four additional number value indicating colors must appear upon the $M_4$=70 tiles, and in $V_4$ the total of the thirteen color indicated values=420. Also in the $V_4$ variant, the middle number within the set $S_4$ is 6, and twelve rotations among $V_4$'s 70 unique rotations have a sum of 6. Accordingly, within $V_4$'s set of 70 tiles, twelve tiles have a first unique color representing the number value 12. In $V_4$, each of the 5 and 7 values are repeated ten times. Accordingly in $V_4$, second and third unique colors are presented on tiles ten times each. In $V_4$, the 4 and 8 values are each repeated nine times. Accordingly in $V_4$, fourth and fifth unique colors are presented on tiles nine times each. In $V_4$, each of the 3 and 9 values are repeated five times. Accordingly, in $V_4$, sixth and seventh unique colors are repeated five times each. Also in the $V_4$ variant, each of the 2 and 10 values is repeated three times. Accordingly, eighth and ninth unique colors are repeated in $V_4$ three times. Finally in the $V_4$ variant, each of the values 0, 1, 11, and 12 appears only once. Accordingly, tenth, eleventh, twelfth, and thirteenth unique colors are respectively assigned to $V_4$'s four remaining tiles.

In the $V_4$ method 14 submatrixes are created, each comprising five tiles arranged in a five tile "+" pattern, each such pattern having four end tiles. In the "+" configuration, each end tile abuts one of the four sides of a fifth middle tile. In the $V_4$ method, each five tile "+" configured submatrix must have a total tiles value of 420/14 or 30.

In order to assist an artist in performance of the $V_3$ or $V_4$ method, the artist may be provided with a printed key which associates numbers with their assigned number indicating color. The number of renditions of each color indicating value with the $M_3$ or $M_4$ set may also be shown or graphically represented upon the printed key. Alternatively, such numbers may be printed directly upon the tiles. Upon repeated performances of the method, the artist may memorize the tile's color based number indicia, obviating any need for a printed key.

The instant inventive method may suitably be performed by plurality of co-artists who may place tiles within the submatrixes in an alternating fashion. Where co-artists perform the method, one co-artist may determine and reverse an attempted illegal tile placement made by another of the other co-artists.

While the tiles and board provided in the instant invention are preferred to be physical objects, digital or computer generated tiles and board surfaces which are displayed upon a computer's video output are considered to constitute tiles and boards, and are considered to fall within the scope of the invention.

Accordingly, objects of the instant invention include the provision of a method for creating a work of graphic art which incorporates steps as described above.

Other and further objects, benefits, and advantages of the instant invention will become known to those skilled in the art upon review of the Detailed Description which follows, and upon review of the appended drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF A PREFERRED EMBODIMENT

Figure 1:
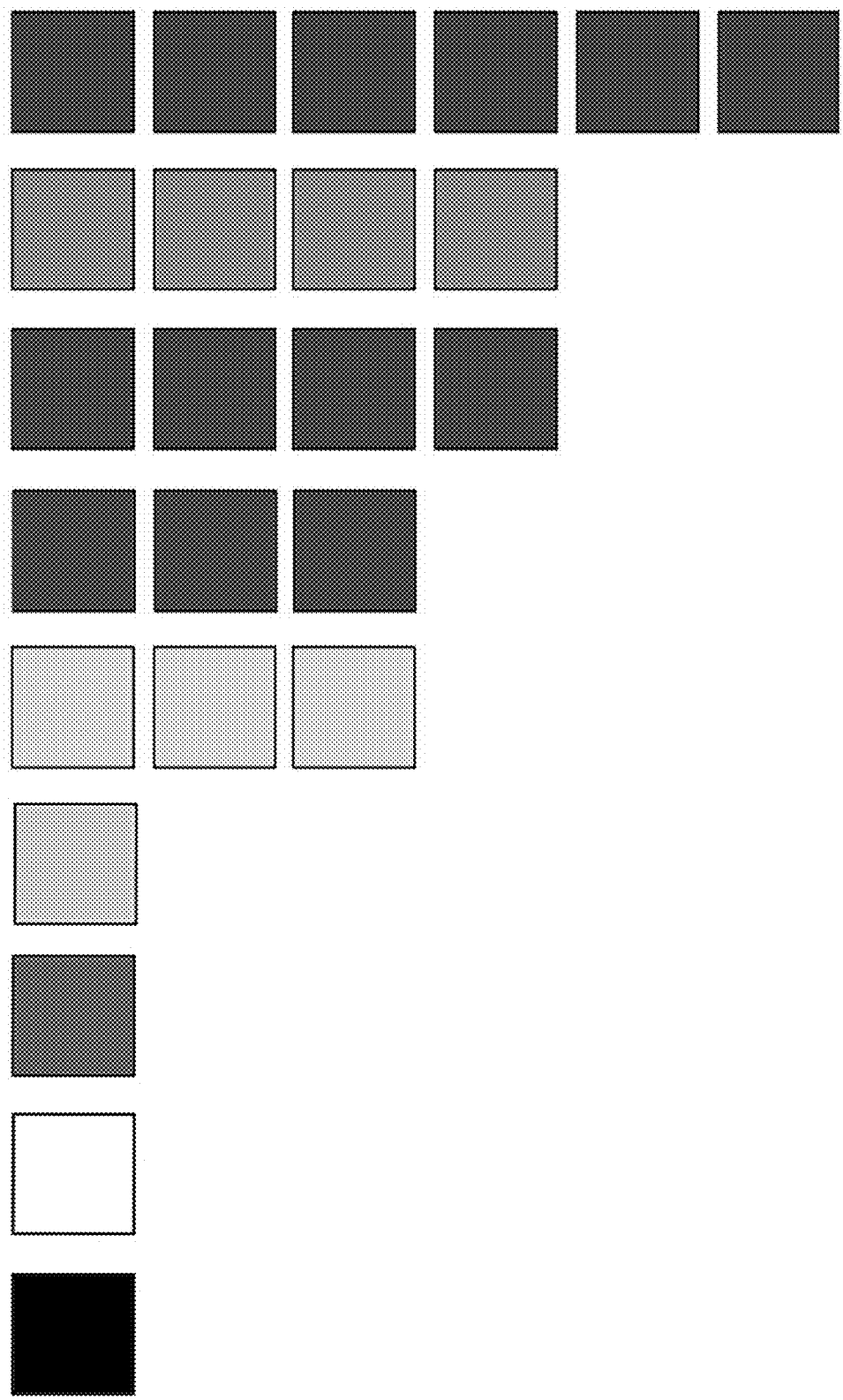
FIG. 1 presents 24 colored tiles which may be provided in accordance with a variation of the instant inventive method.
Figure 2:
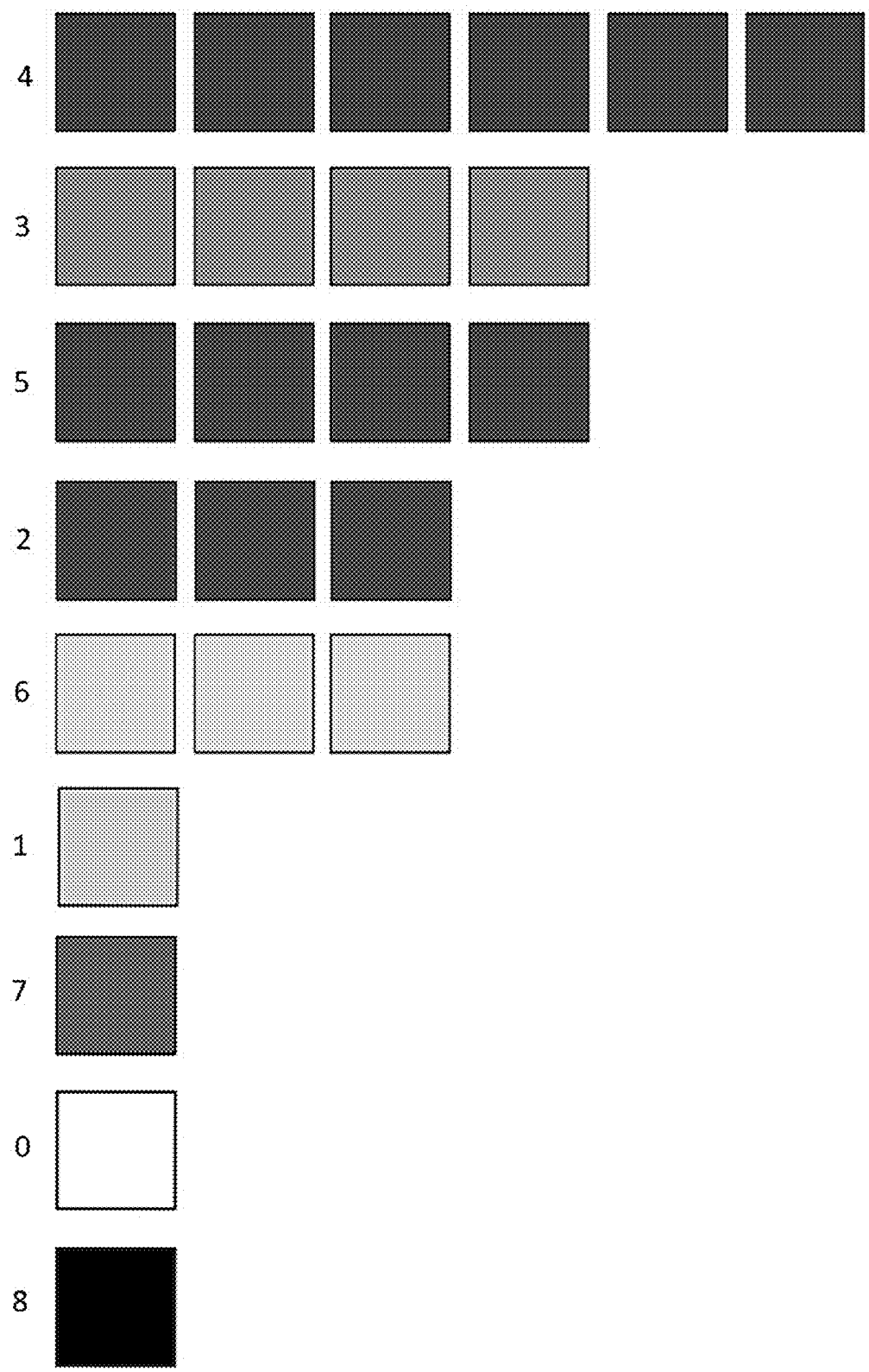
FIG. 2 reproduces FIG. 1, the view of FIG. 2 additionally showing tile values associated with the tiles' colors.

Referring now to the drawings and in particular to Drawing FIG. 1, the instant inventive method for creating a work of graphic art comprises and incorporates a step of providing six rectangular tiles. As shown in FIG. 1, the six blue colored squares are representative of such step of providing such six tiles. As shown in FIG. 1, each of the rectangular tiles is preferably substantially square. Referring further to FIG. 2, in accordance with the instant inventive method a unique color which signifies the number four is repeated upon the six tiles six times, and the blue coloration upon FIGS. 1 and 2 represents such number four indicia. FIG. 2 is representative of a printed tile values key which may be provided to and utilized by artists, operators, and performers of the instant inventive method prior to their memorization of the tiles and their color based number value indicia.

In further performance of the instant inventive method, four additional rectangular or substantially square tiles are provided. Such tiles, as shown in the FIG. 1 example, display a second unique color. For example, green, which signifies the number value three.

As shown in FIGS. 1 and 2, four additional tiles are provided, each having, for example, a brown coloration signifying the number value five. Also as shown in FIGS. 1 and 2, three additional tiles are provided each having, for example, a red coloration signifying the number value two. FIGS. 1 and 2 show a provision of three additional tiles each having, for example, a yellow coloration signifying the number value six. Four single tiles are also provided having exemplary light gray, dark gray, white, and black colorations, such colors respectively signifying the number values one, seven, zero, and eight.

The white field upon which the blue, green, brown, red, yellow, light gray, dark gray, white, and black tiles appear in FIG. 1 is intended as being representative of a method step wherein a substantially flat surface is provided upon which such tiles may be successively placed. Such surface may suitably comprise a canvas or cardboard display surface. The tiles may be composed of wood, ceramic, plastic, or metal.

Figure 3:
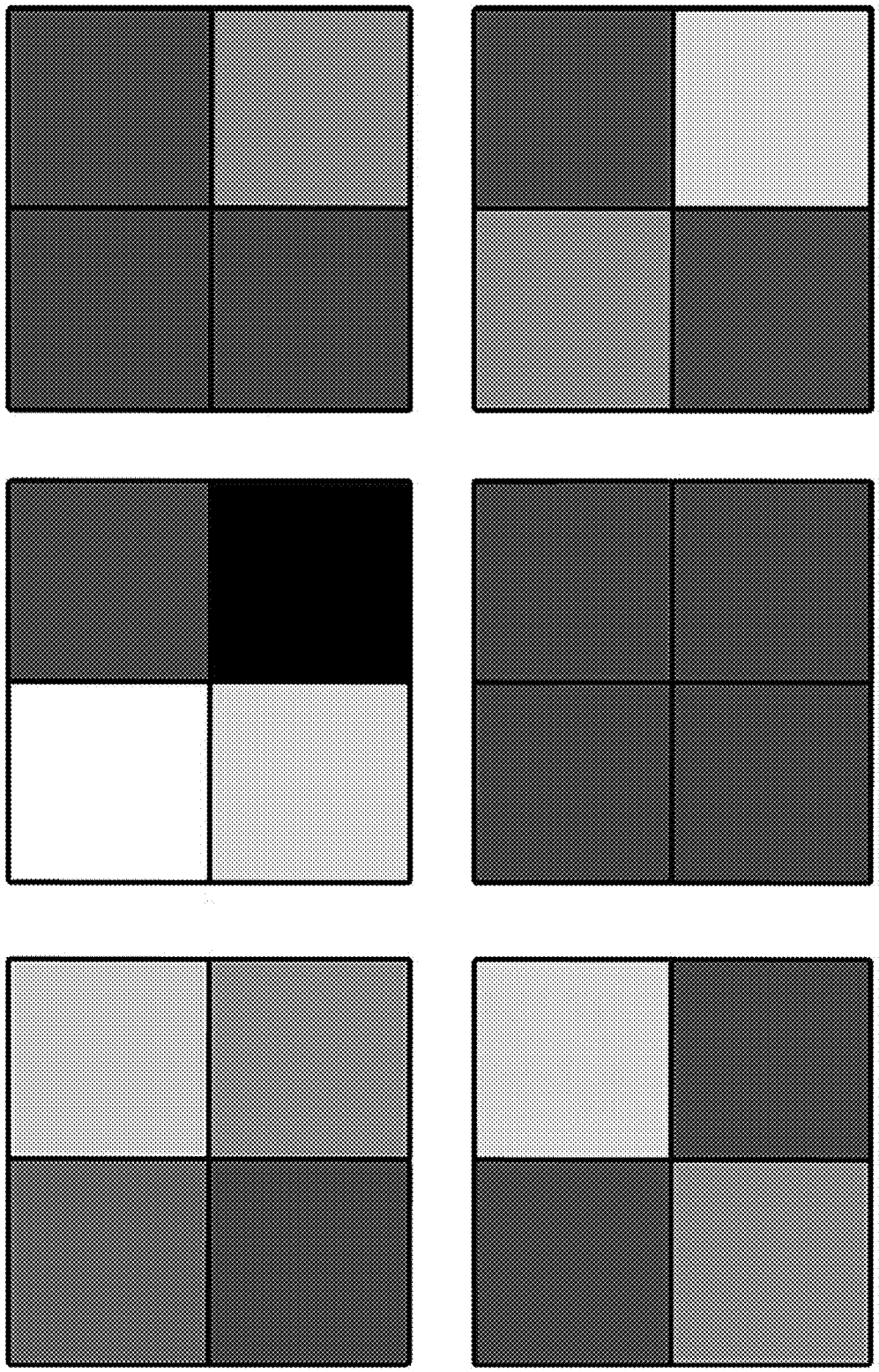
FIG. 3 shows a work of graphic art completed in accordance with the instant inventive method.

Following execution of the above described object and article providing steps of the instant inventive method, an operator or artist who performs the method may successively select single tiles from the 24 tiles shown upon FIG. 1, and may place each selected tile upon the flat surface. Looking to FIG. 3, it may be seen that FIG. 1's 24 tiles are shown arranged by such successive tile placements in a matrix of six submatrixes wherein each submatrix includes four of the tiles. As shown in FIG. 3, each submatrix is preferably square.

Correlation of the color signified tile values shown on the FIG. 2 key with the six submatrixes shown on FIG. 3, allows one to recognize that the sum of the color signified tile values within each of the six submatrixes equals 16. In performance of the instant inventive method, the tiles must be successively placed within the four tile submatrixes so that the tile values within each submatrix total 16. Multiple operators or co-artists may take turns in their successive placements of the tiles within the submatrixes.

Figure 4:
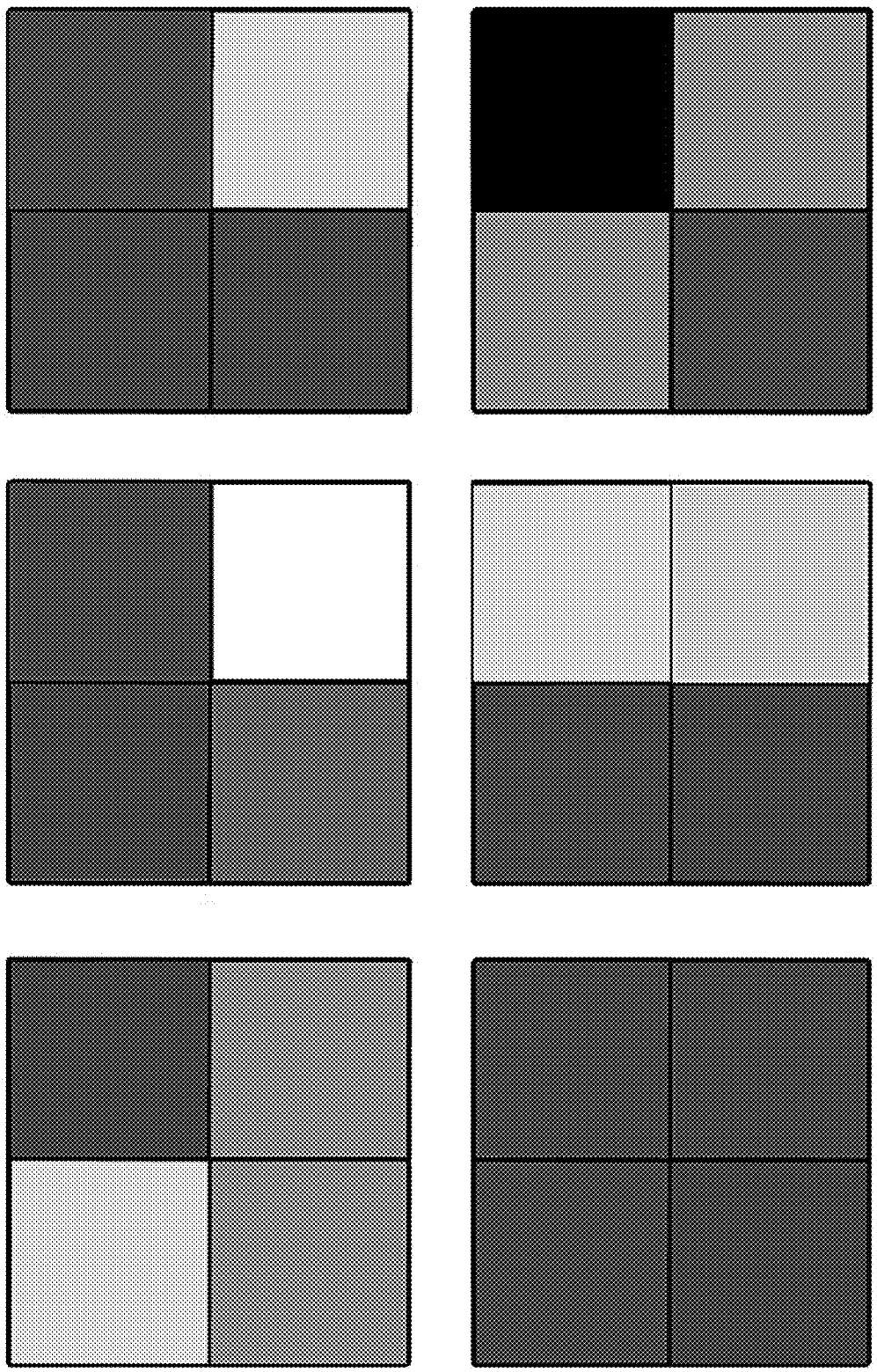
FIG. 4 shows a variation of FIG. 3's work of graphic art.

FIG. 4 is another exemplary matrix of submatrixes which satisfy the inventive method's 16 value submatrix requirement. According to the method of the invention, numerous versions of such matrix are possible.

Figure 5:
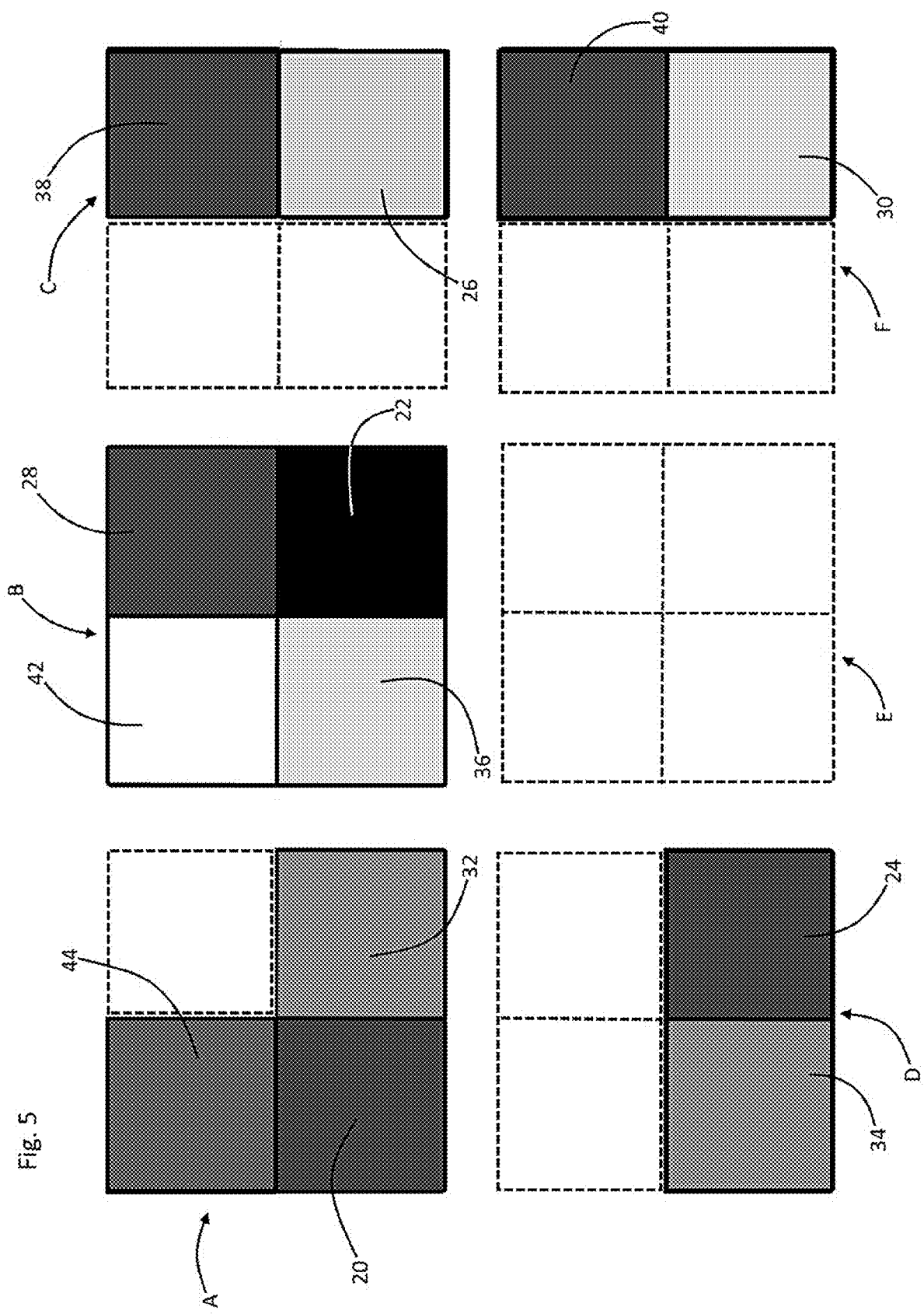
FIG. 5 demonstrates a progression of tile placements executed in an alternative performance of the method.
Figure 6:
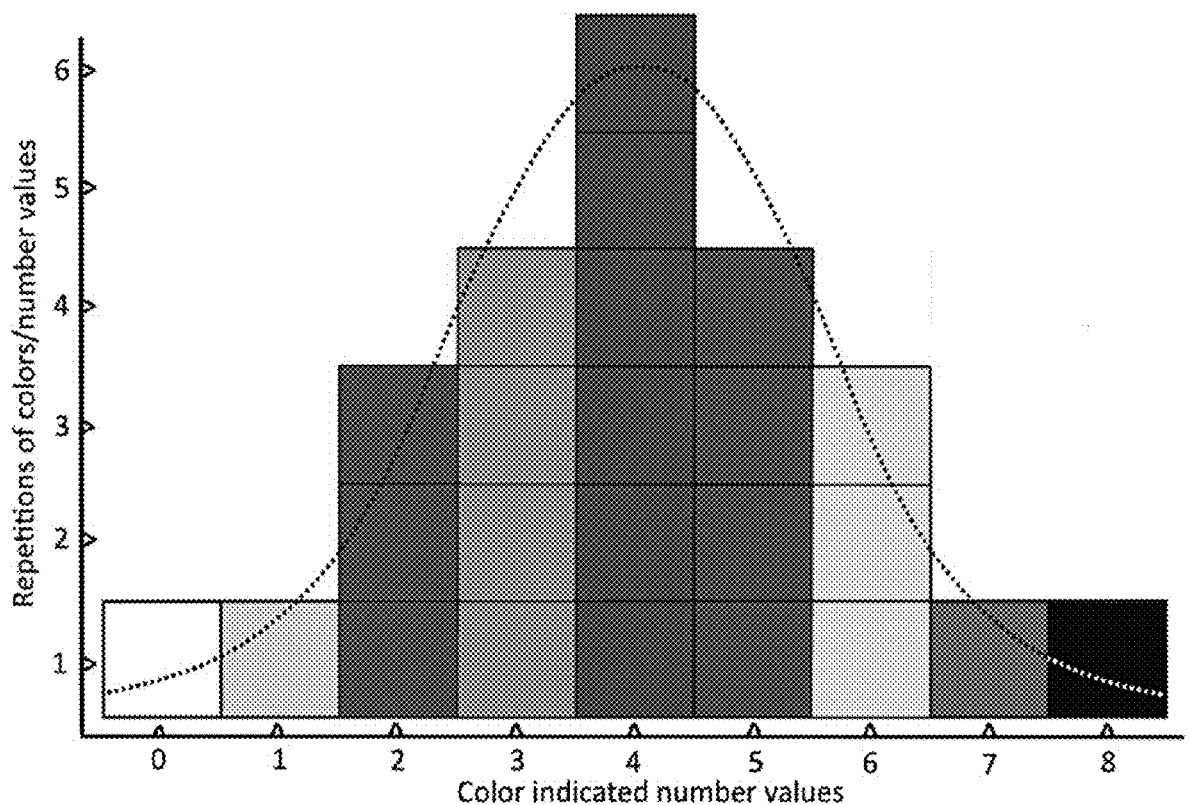
FIG. 6 presents the tiles of FIG. 1 in a graph.

Referring to FIG. 5, in an attempted performance of the instant inventive method, and assuming that the set of 24 colored tiles exemplified in FIG. 1 are provided, the artist or operator may make successive tile placements, placing a brown tile 20 as indicated in submatrix A, then placing the black tile 22 in submatrix B, then placing another brown tile 24 in submatrix D, then placing the light gray tile 26 in submatrix C, then placing a red tile 28 in submatrix B, then placing a yellow tile 30 in submatrix F, then placing a green tile 32 in submatrix A, then placing another green tile 34 in submatrix D, then placing another yellow tile 36 in submatrix B, then placing another brown tile 38 in submatrix C, then placing the last brown tile 40 in submatrix F, and then placing the white tile 42 in submatrix B.

Thereafter, the artist or operator may erroneously attempt to place the dark gray tile 44 within submatrix ▲, as indicated in FIG. 5. However, the previously placed brown tile 20 within submatrix A has a color indicated value of 5, and the previously placed green tile within submatrix A has a value of 3.

Accordingly, the cumulative previously placed tile values within submatrix A equals 8.

Following the attempted placement of the 7 value dark gray tile 44 within submatrix A, the cumulative tile value within such submatrix would be 15. Following such placement of the dark gray tile 44 within the submatrix A, the only possible way to complete the submatrix A with a total 16 value would entail a subsequent placement of the single light gray tile 26, having a value of one, into the A submatrix. However, as shown in FIG. 5, such tile 26 has been previously placed within submatrix C.

Accordingly, upon placement of the dark gray tile 44 within submatrix ▲, it would be mathematically impossible to complete that submatrix A with a 16 value. Accordingly, the placement of the dark gray tile 44 within submatrix A constitutes an improper or illegal tile placement. Such placement of the dark gray tile 44 within submatrix A falls outside of performance of the instant inventive method. According to the instant inventive method, such tile would be required to be removed from submatrix A.

In accordance with the above exemplary performance of the instant inventive method, where a placement of any of FIG. 1's 24 tiles within any of the six submatrixes results in mathematical impossibility of completion of six 16 value submatrixes, such tile placement falls outside of the method steps of the instant invention. Where such placement occurs, a tile removal step of the invention must be performed.

In the above exemplary performance of the graphic art creation method, the steps of provisions of tiles, along with their placements within the matrix's submatrixes, are based upon and mathematically derived from the number 3. An alternative version of the method is based upon and is mathematically derived from the number 4. In the number 4 based alternative, 70 tiles are provided, and thirteen colors are displayed upon those tiles, such colors signifying a total color indicated tiles value of 420. In the number 4 based variant of the method, fourteen submatrixes of five tiles are placed upon the surface. In each such submatrix, the cumulative color indicated values equal 420/14 or 30.

Each of the number 4 based variant's submatrixes is preferably "+" configured, having four ends or arms. In such "+" submatrix configurations, a first or middle tile has abutting second, third, fourth, and fifth tiles, such tiles being placed respectively above, below, to the left of, and to the right of the first or middle tile.

While the principles of the invention have been made clear in the above illustrative embodiment, those skilled in the art may make modifications in the structure, arrangement, portions and components which the method provides without departing from those principles. Those skilled in the art may also modify the invention's other method steps including changes to their identity, character, and sequence of performance without departing from those principles. Accordingly, it is intended that the description and drawings be interpreted as illustrative and not in the limiting sense, and that the invention be given a scope at least commensurate with the appended claims.

The invention hereby claimed is:

1. A method for creating a work of graphic art comprising steps of:
    (a) providing six tiles, each of said six tiles displaying a color signifying four;
    (b) providing four more tiles, each of said four more tiles displaying another color signifying three;
    (c) providing four more tiles, each of said four more tiles displaying another color signifying five;
    (d) providing three more tiles, each of said three more tiles displaying another color signifying two;
    (e) providing three more tiles, each of said three more tiles displaying another color signifying six;
    (f) providing one more tile displaying another color signifying one;
    (g) providing another tile displaying another color signifying seven;
    (h) providing another tile displaying another color signifying zero;
    (i) providing another tile displaying another color signifying eight;
    (j) providing a surface; and
    (k) successively placing said tiles upon the surface so that said tiles form a matrix of six submatrixes, wherein each submatrix comprises four of the tiles, and wherein the sum of the numbers signified by each submatrix's colors equals 16.

2. The method of claim 1 wherein each tile is square.

3. The method of claim 2 wherein each submatrix is square.

4. The method of claim 3 wherein the surface comprises a surface of a board.

5. The method of claim 4 wherein the steps of successively placing the tiles are performed by a plurality of co-artists who make the tile placements in an alternating fashion.

6. A method for creating a work of graphic art comprising steps of:
    (a) providing twelve tiles, each of said twelve tiles displaying a color signifying six;
    (b) providing ten more tiles, each of said ten more tiles displaying another color signifying five;
    (c) providing ten more tiles, each of said ten more tiles displaying another color signifying seven;
    (d) providing nine more tiles, each of said nine more tiles displaying another color signifying four;
    (e) providing nine more tiles, each of said nine more tiles displaying another color signifying eight;
    (f) providing five more tiles, each of said five more tiles displaying another color signifying three;
    (g) providing five more tiles, each of said five more tiles displaying another color signifying nine;
    (h) providing three more tiles, each of said three more tiles displaying another color signifying two;
    (i) providing three more tiles, each of said three more tiles displaying another color signifying ten;
    (j) providing a one more tile displaying another color signifying one;
    (k) providing one more tile displaying another color signifying eleven;
    (l) providing one more tile displaying another color signifying zero;
    (m) providing one more tile displaying another color signifying twelve;
    (n) providing a surface; and
    (o) successively placing said tiles upon the surface so that said tiles form a matrix of fourteen submatrixes, wherein each submatrix comprises five of the tiles, and wherein the sum of the numbers signified by each submatrix's colors equals 30.

7. The method of claim 6 wherein each tile is square.

8. The method of claim 7 wherein each submatrix is "+" configured.

9. The method of claim 8 wherein each "+" configured submatrix of tiles has four ends comprising a tile above a middle tile, a tile to the left of the middle tile, a tile to the right of the middle tile, and a tile below the middle tile.

10. The method of claim 9 wherein the surface comprises a surface of a board.

11. The method of claim 10 wherein the successively placing tiles steps are performed by a plurality of co-artists who make the tile placements in an alternating fashion.

\* \* \* \* \*